United States Patent
Sakhnini et al.

(10) Patent No.: US 11,818,770 B2
(45) Date of Patent: Nov. 14, 2023

(54) RANDOM ACCESS CHANNEL BEAM MANAGEMENT

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 17/303,627

(22) Filed: Jun. 3, 2021

(65) Prior Publication Data

US 2021/0392697 A1    Dec. 16, 2021

Related U.S. Application Data

(60) Provisional application No. 63/038,466, filed on Jun. 12, 2020.

(51) Int. Cl.
*H04W 74/08* (2009.01)
*H04W 72/044* (2023.01)
*H04W 74/00* (2009.01)

(52) U.S. Cl.
CPC ..... *H04W 74/0841* (2013.01); *H04W 72/046* (2013.01); *H04W 74/006* (2013.01); *H04W 74/0891* (2013.01)

(58) Field of Classification Search
CPC ........... H04W 74/0841; H04W 72/046; H04W 74/006; H04W 74/0891; H04W 74/0833
See application file for complete search history.

(56) References Cited

U.S. PATENT DOCUMENTS

| | | | | |
|---|---|---|---|---|
| 2014/0098660 | A1* | 4/2014 | Viorel | H04W 28/0205 370/229 |
| 2018/0324623 | A1* | 11/2018 | Jung | H04W 24/08 |
| 2020/0146070 | A1* | 5/2020 | Xiong | H04L 1/0045 |
| 2020/0374835 | A1* | 11/2020 | Gao | H04W 74/0833 |
| 2021/0068162 | A1* | 3/2021 | Agiwal | H04L 5/0023 |
| 2021/0352734 | A1* | 11/2021 | Svedman | H04W 72/1263 |

FOREIGN PATENT DOCUMENTS

| | | |
|---|---|---|
| WO | 2019104299 A1 | 5/2019 |
| WO | 2020067950 A1 | 4/2020 |

OTHER PUBLICATIONS

International Search Report and Written Opinion—PCT/US2021/070663—ISA/EPO—dated Sep. 23, 2021.

* cited by examiner

*Primary Examiner* — Ivan O Latorre
(74) *Attorney, Agent, or Firm* — Harrity & Harrity, LLP

(57) ABSTRACT

Various aspects of the present disclosure generally relate to wireless communication. In some aspects, a user equipment may receive information indicating a switch from using a first set of random access channel (RACH) occasions (ROs) for physical RACH (PRACH) communications to using a second set of ROs for the PRACH communications; and transmit a PRACH communication using an RO, of the second set of ROs, based at least in part on receiving the information indicating the switch. Numerous other aspects are provided.

30 Claims, 9 Drawing Sheets

RANDOM ACCESS CHANNEL BEAM MANAGEMENT

CROSS-REFERENCE TO RELATED APPLICATION

This Patent Application claims priority to U.S. Provisional Patent Application No. 63/038,466, filed on Jun. 12, 2020, entitled "RANDOM ACCESS CHANNEL BEAM MANAGEMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for random access channel beam management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include, a number of base stations (BSs) that can support communication for a number of user equipment (LTEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO)) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving information indicating a switch from using a first set of random access channel (RACH) occasions (ROs) for physical RACH (PRACH) communications to using a second set of ROs for the PRACH communications; and transmitting a PRACH communication using an RO, of the second set of ROs, based at least in part on receiving the information indicating the switch.

In some aspects, a method of wireless communication performed by a base station includes transmitting, to a UE, information indicating a switch from using a first set of ROs for PRACH communications to using a second set of ROs for the PRACH communications; and receiving, from the UE, a PRACH communication using an RO, of the second set of ROs, based at least in part on transmitting the information indicating the switch.

In some aspects, a UE for wireless communication includes a memory, and one or more processors operatively coupled to the memory, the memory and the one or more processors configured to: receive information indicating a switch from using a first set of ROs for PRACH communications to using a second set of ROs for the PRACH communications, and transmit a PRACH communication using an RO, of the second set of ROs, based at least in part on receiving the information indicating the switch.

In some aspects, a BS for wireless communication includes a memory, and one or more processors operatively coupled to the memory, the memory and the one or more processors configured to: transmit, to a UE, information indicating a switch from using a first set of ROs for PRACH communications to using a second set of ROs for the PRACH communications; and receive, from the UE, a PRACH communication using an RO, of the second set of ROs, based at least in part on transmitting the information indicating the switch.

In some aspects, a non-transitory computer-readable medium storing one or more instructions for wireless communication includes one or more instructions that, when executed by one or more processors of a UE, cause the one or more processors to: receive information indicating a switch front using a first set of ROs for PRACH communications to using a second set of ROs for the PRACH communications; and transmit a PRACH communication using an RO, of the second set of ROs, based at least in part on receiving the information indicating the switch.

In some aspects, a non-transitory computer-readable medium storing one or more instructions for wireless communication includes one or more instructions that, when executed by one or more processors of a BS, cause the one or more processors to: transmit, to a UE, information indicating a switch from using a first set ROs for PRACH communications to using a second set of ROs for the PRACH communications; and receive, from the UE, a PRACH communication using an RO, of the second set of ROs, based at least in part on transmitting the information indicating the switch.

In some aspects, an apparatus for wireless communication includes means for receiving information indicating a switch from using a first set of ROs for PRACH communications to using a second set of ROs for the PRACH communications; and means for transmitting a PRACH communication using an RO, of the second set of ROs, based at least in part on receiving the information indicating the switch.

In some aspects, an apparatus for wireless communication includes mans for transmitting, to a UE, information indicating a switch from using a first set of ROs for PRACH communications to using a second set of ROs for the PRACH communications; and means for receiving, from the UE, a PRACH communication using an RO, of the second set of ROs, based at least in part on transmitting the information indicating the switch.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
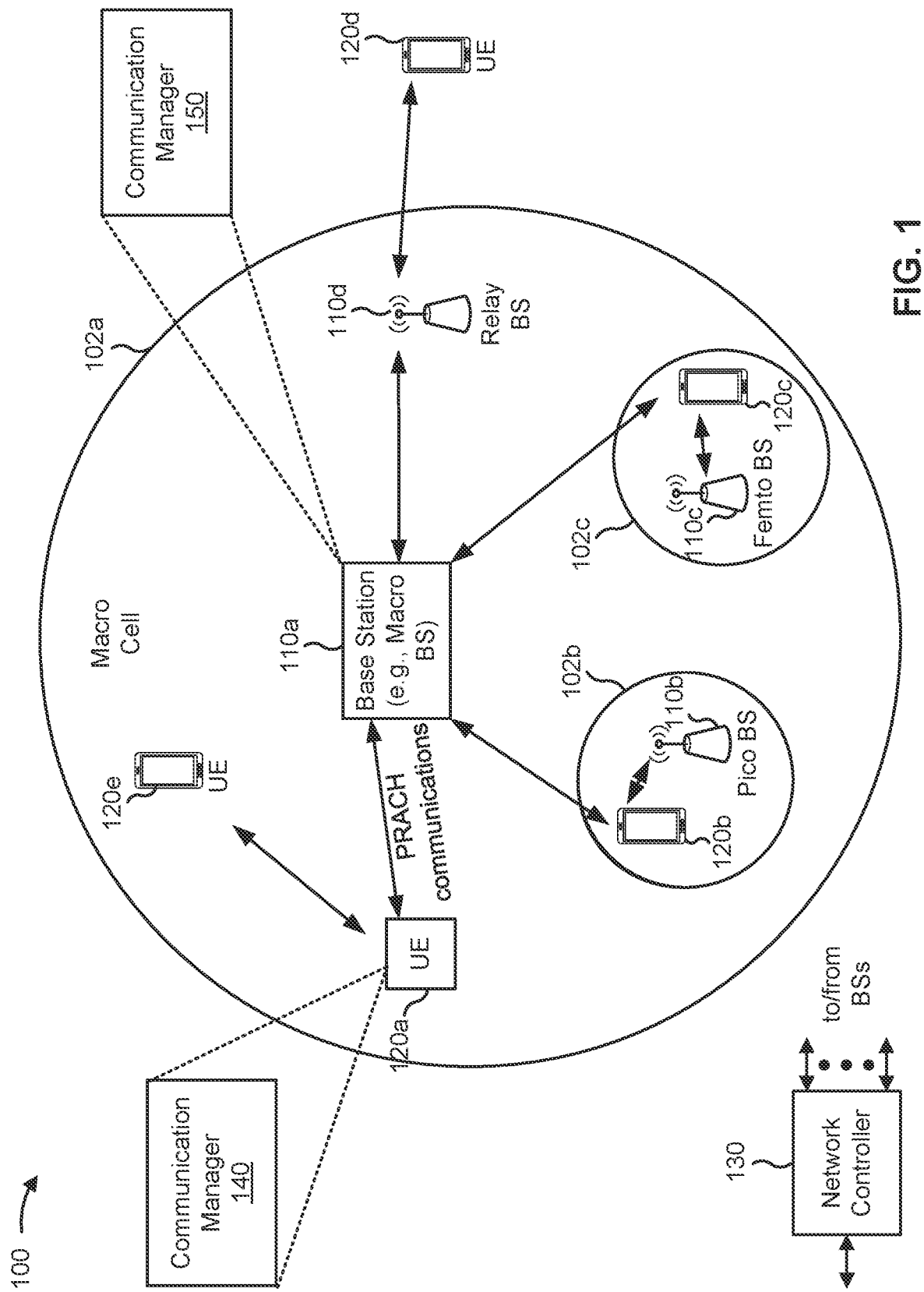
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas Pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In some aspects, a base station may serve different UEs of different categories and/or different UEs that support different capabilities. For example, the base station 110 may serve a first category of UEs 120 that have a less advanced capability (e.g., a lower capability and/or a reduced capability) and a second category of UEs 120 that have a more advanced capability (e.g., a higher capability). A UE of the first category may have a reduced feature set compared to UEs of the second category and may be referred to as a reduced capability (RedCap) UE, a low tier UE, and/or an NR-Lite UE, among other examples. A UE of the first category may be, for example, an MTC UE, an eMTC UE, and/or an IoT UE. A UE of the second category may have an advanced feature set compared to UEs of the second category and may be referred to as a baseline LTE, a high tier UE, an NR UE, and/or a premium UE, among other examples. In some aspects, a UE of the first category has capabilities that satisfy requirements of a first (earlier) wireless communication standard but not a second (later) wireless communication standard, while a UE of the second category has capabilities that satisfy requirements of the second (later) wireless communication standard (and also the first wireless communication standard, in some cases).

For example, UEs of the first category may support a lower maximum modulation and coding scheme (MCS) than UEs of the second category (e.g., quadrature phase shift keying (QPSK) or the like as compared to 256-quadrature amplitude modulation (QAM) or the like), may support a lower maximum transmit power than UEs of the second category, may have a less advanced beamforming capability than UEs of the second category (e.g., may not be capable of forming as many beams as UEs of the second category), may require a longer processing time than UEs of the second category, may include less hardware than UEs of the second category (e.g., fewer antennas, fewer transmit antennas, and/or fewer receive antennas), and/or may not be capable of communicating on as wide of a maximum bandwidth part as UEs of the second category, among other examples. Additionally, or alternatively, UEs of the second category may be capable of communicating using a shortened transmission time interval (TTI) (e.g., a slot length of 1 ms or less, 0.5 ms, 0.25 ms, 0.125 ms, 0.0625 ms, or the like, depending on a sub-carrier spacing), and UEs of the first category may not be capable of communicating using the shortened TTI.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR, or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive information indicating a switch front using a first set of random access channel (RACH) occasions (ROs) for physical RACH (PRACH) communications to using a second set of ROs for the PRACH communications; and transmit a PRACH communication using an RO, of the second set of ROs, based at least in part on receiving the information indicating the switch. Additionally, or alternatively, the communication manager 140 may perform one or more other operations described herein.

In some aspects, the base station 110 may include a communication manager 150. As described in more detail elsewhere herein, the communication manager 150 may transmit information indicating a switch from using a first set of ROs for PRACH communications to using a second set of ROs for the PRACH communications; and receive a PRACH communication using an RO, of the second set of ROs, based at least in part on transmitting the information indicating the switch. Additionally, or alternatively, the communication manager 150 may perform one or more other operations described herein.

As indicated above, FIG. 1 is provided as an example. Other examples may differ from what is described with regard to FIG. 1.

Figure 2:
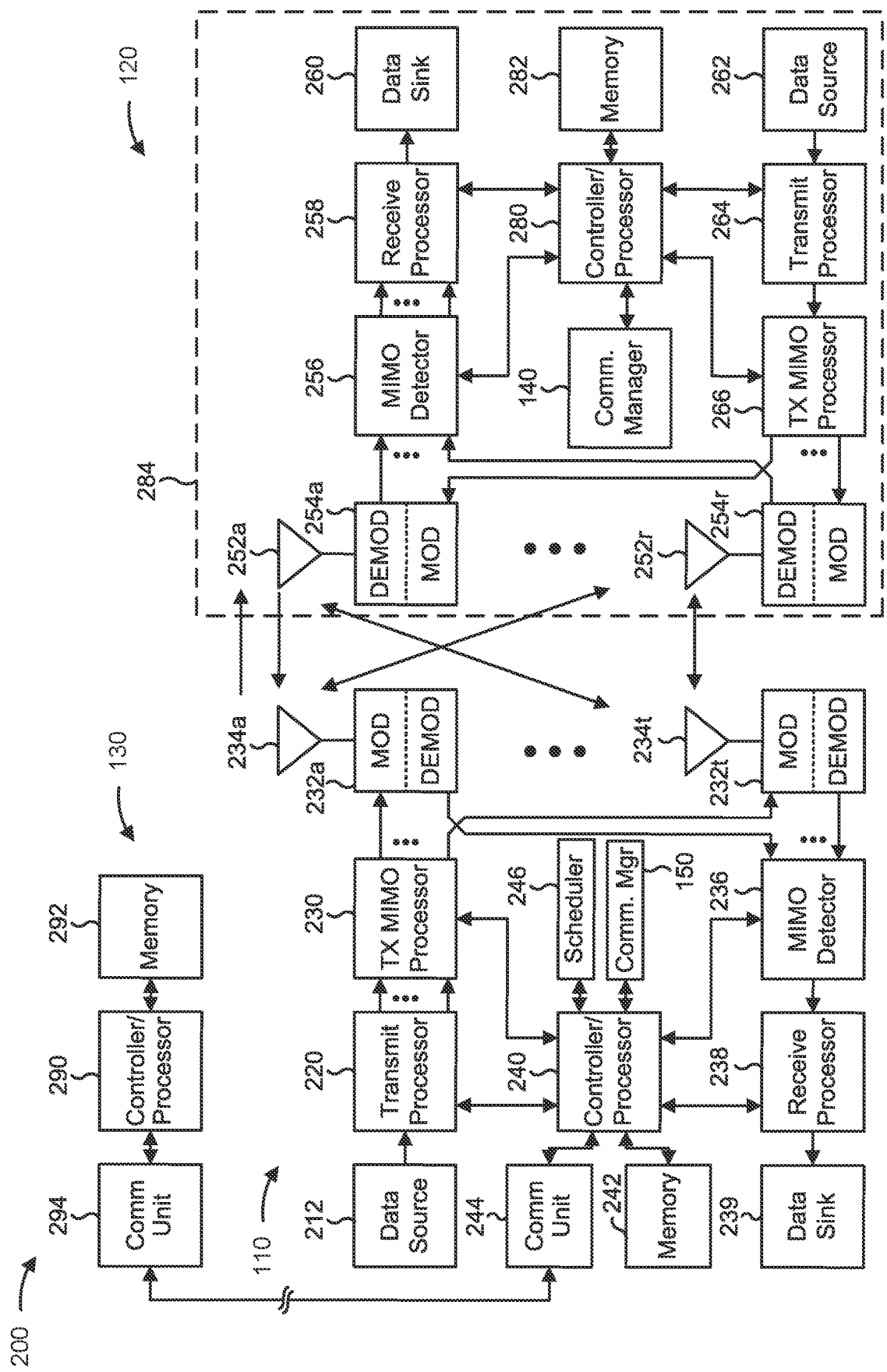
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more MCSs for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a, through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-7.

Controller/processor 240 of base station 110, controller/processor 280 of UE 120, and/or any other component(s) of FIG. 2 may perform one or more techniques associated with random access channel management, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, a UE includes means for receiving information indicating a switch from using a first set of ROs for PRACH communications to using a second set of ROs for the PRACH communications; and/or means for transmitting a PRACH communication using an RO, of the second set of ROs, based at least in part on receiving the information indicating the switch. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a BS includes means for transmitting information indicating a switch from using a first set of ROs for PRACH communications to using a second set of ROs for the PRACH communications; and/or means for receiving, from the UE, a PRACH communication using an RO, of the second set of ROs, based at least in part on transmitting the information indicating the switch. The means for the BS to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
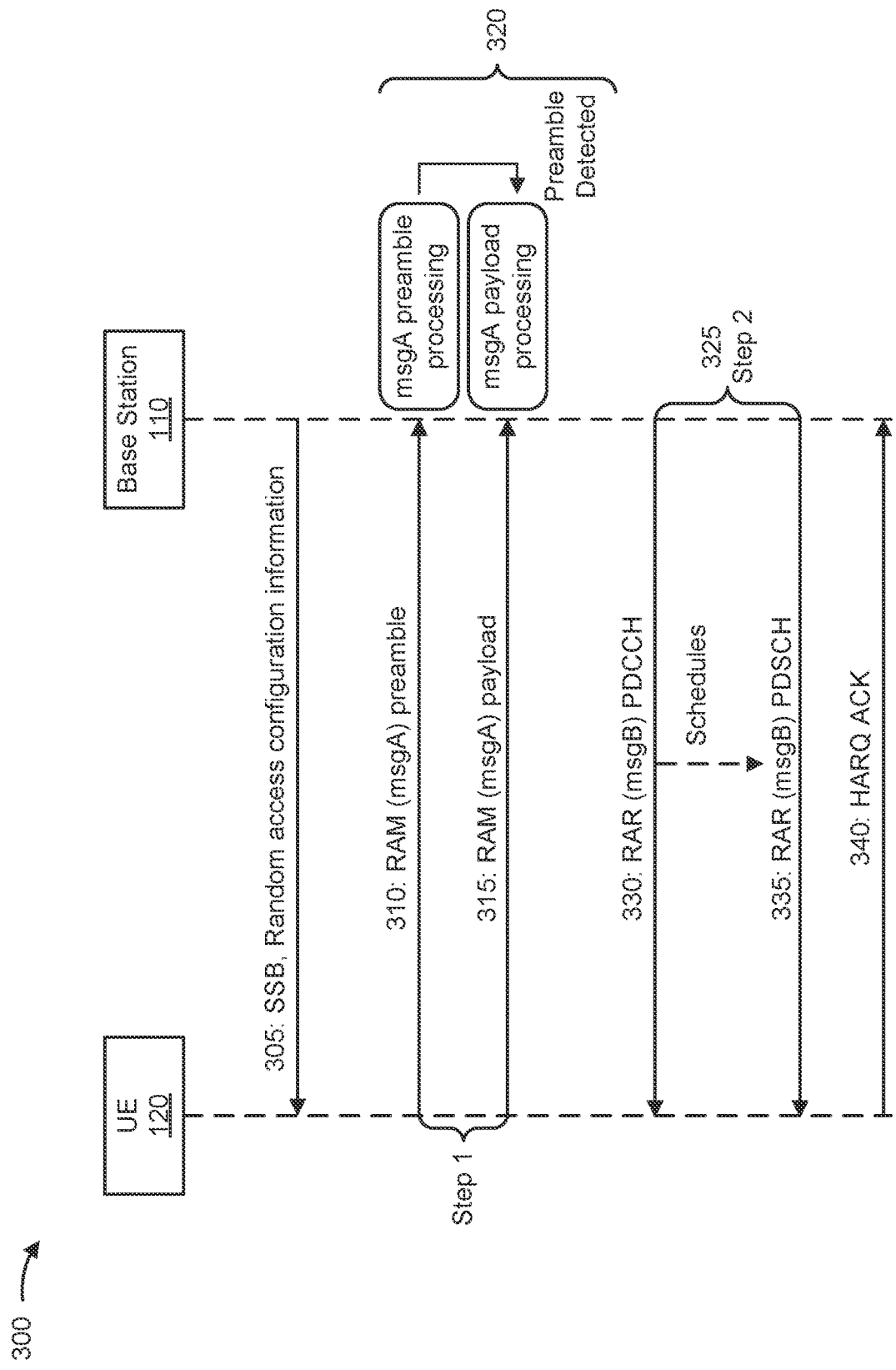
FIG. 3 is a diagram illustrating an example of a two-step random access procedure, in accordance with the present disclosure.

FIG. 3 is a diagram illustrating an example 300 of a two-step random access procedure, in accordance with the present disclosure. As shown in FIG. 3, a base station 110 and a UE 120 may communicate with one another to perform the two-step random access procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs) and/or the like) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the two-step random access procedure, such as one or more parameters for transmitting a random access message (RAM), receiving a random access response (RAR) to the RAM, and/or the like.

As shown by reference number 310, the UE 120 may transmit, and the base station 110 may receive, a RAM preamble. As shown by reference number 315, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, a first message, an initial message, and/or the like in a two-step random access procedure. Furthermore, in some aspects, the RAM preamble may be referred to as a message A preamble, a msgA preamble, a preamble, a PRACH preamble, and/or the like, and the RAM payload may be referred to as a message A payload, a msgA payload, a payload, and/or the like. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), a physical uplink shared channel (PUSCH) transmission, and/or the like).

As shown by reference number 320, the base station 110 may receive the RAM preamble transmitted by the UE 120. If the base station 110 successfully receives and decodes the RAM preamble, the base station 110 may then receive and decode the RAM pay load.

As shown by reference number 325, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing a chance value, contention resolution information, and/or the like.

As shown by reference number 330, as part of live second step of the two-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 335, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 340, if the UE 120 successfully receives the RAR, the UE 120 may transmit a hybrid automatic repeat request (HARQ) acknowledgement (ACK).

As indicated above, FIG. 3 is provided as an example. Other examples may differ from what is described with regard to FIG. 3.

Figure 4:
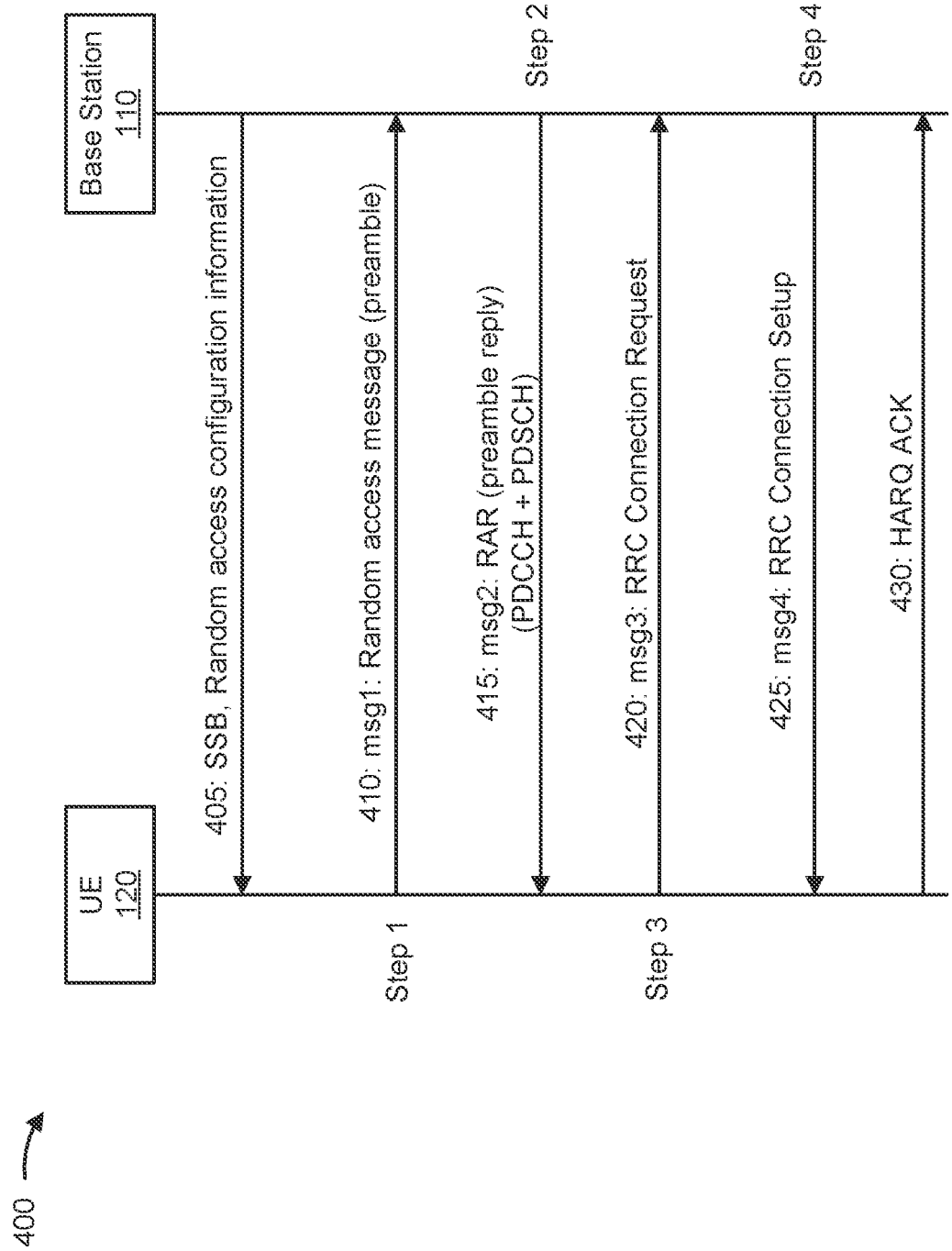
FIG. 4 is a diagram illustrating an example of a four-step random access procedure, in accordance with the present disclosure.

FIG. 4 is a diagram illustrating an example of a four-step random access procedure, in accordance with the present disclosure. As shown in FIG. 4, a base station 110 and a UE 120 may communicate with one another to perform the four-step random access procedure.

As shown by reference number 405, the base station 110 may transmit, and the UE 120 may receive, one or more SSBs and random access configuration information. In some aspects, the random access configuration information may be transmitted in and/or indicated by system information (e.g., in one or more SIBs and/or the like) and/or an SSB, such as for contention-based random access. Additionally, or alternatively, the random access configuration information may be transmitted in an RRC message and/or a PDCCH order message that triggers a random access procedure (e.g., a RACH procedure), such as for contention-free random access. The random access configuration information may include one or more parameters to be used in the random access procedure, such as one or more parameters for transmitting a RAM, one or more parameters for receiving an RAR, and/or the like.

As shown by reference number 410, the UE 120 may transmit a RAM, which may include a preamble (sometimes referred to as a random access preamble, a PRACH preamble, a RAM preamble, and/or the like). The message that includes the preamble may be referred to as a message 1, msg1, MSG1, a first message, an initial message, and/or the like in a four-step random access procedure. The random access message may include a random access preamble identifier.

As shown by reference number 415, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the base station 110 array transmit the PDSCH communication for the RAR, as scheduled by the PDCCH communication. The RAR may be included in a MAC PDU of the PDSCH communication.

As shown by reference number 420, the UE 120 may transmit an RRC connection request message. The RRC connection request message may be referred to as message 3, msg3, MSG3, or a third message of a four-step random access procedure. In some aspects, the RRC connection request may include a UE identifier, UCI, a PUSCH communication (e.g., an RRC connection request), and/or the like.

As shown by reference number 425, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, contention resolution information, and/or the like. As shown by reference number 430, if the UE 120 successfully receives the RRC connection setup message, the UE 120 may transmit a HARQ ACK.

As indicated above, FIG. 4 is provided as an example. Other examples may differ from what is described with regard to FIG. 4.

In some communications systems, a plurality of UEs may connect to a base station using the same cell or beam and may attempt to access a network using a RACH procedure, as described above, at the same time. For example, in IoT deployments, RedCap UEs, as described herein with regard to FIG. 1, may be deployed in the same area to perform the same task (e.g., parking sensors deployed in a parking lot), which may result in many reduced capability UEs communicating with the base station at the same time. As an example, many reduced capability UEs, deployed as parking sensors in a parking lot, may concurrently transmit information indicating whether a parking space is available after an event that results in many vehicles exiting parking spaces at the same time. However, when many UEs attempt to communicate with a base station, concurrently, the many UEs may cause RACH overloading and congestion, which may result in communication failures.

Some aspects described herein enable dynamic RO switching. For example, a base station may determine that a first beam is congested and may transmit information to trigger one or more UEs to switch from using first ROs (e.g., on the first beam) to using second ROs (e.g., on a second beam). Additionally, or alternatively, the base station may configure an autonomous switching pattern to cause a UE to periodically switch between available ROs, thereby avoiding congestion scenarios associated with a threshold quantity of UEs using the same RO. In this way, the base station and the UEs may enable reduced network congestion, a reduction in dropped communications, and/or the like.

Figure 5:
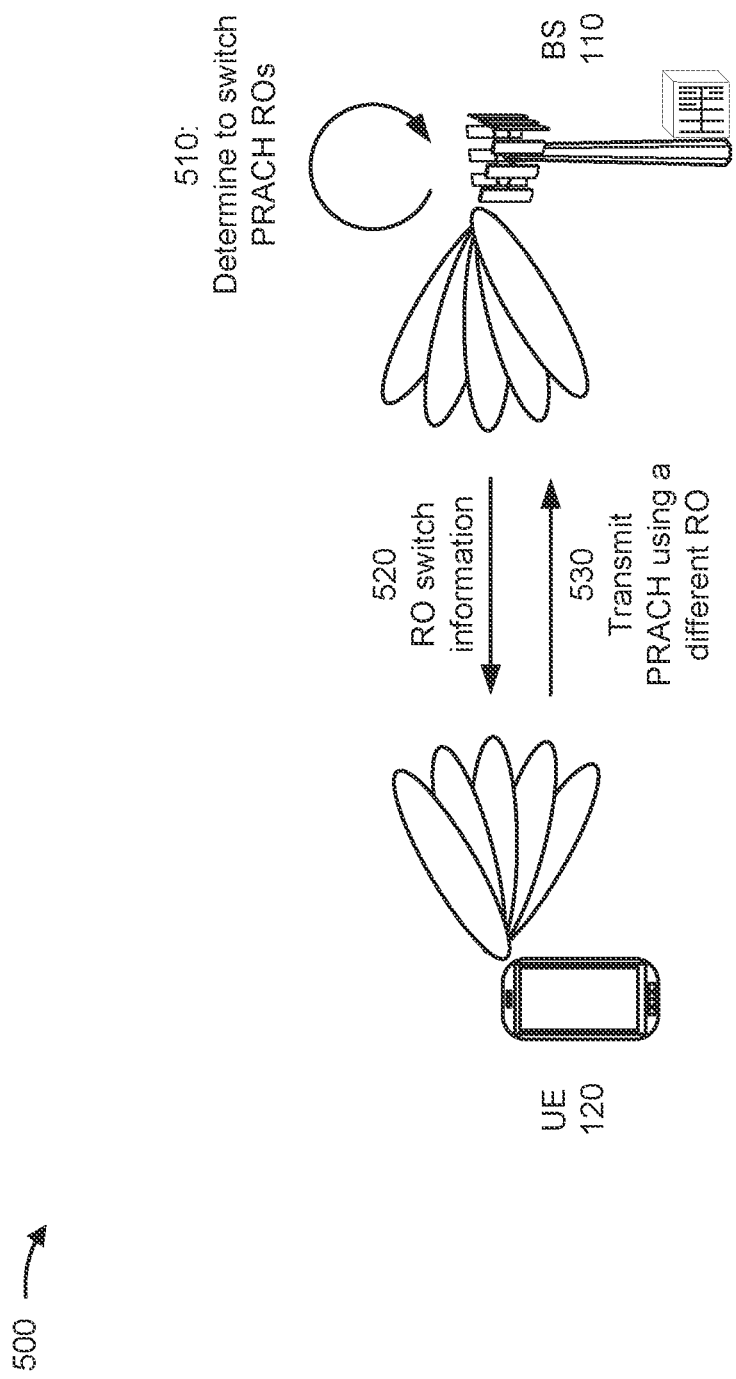
FIG. 5 is a diagram illustrating an example associated with random access channel beam management, in accordance with the present disclosure.

FIG. 5 is a diagram illustrating an example 500 associated with RACH beam management, in accordance with the present disclosure. As shown in FIG. 5, example 500 includes a base station 110 and a UE 120.

As further shown in FIG. 5, and by reference number 510, base station 110 may determine to switch PRACH ROs for UE 120. For example, base station 110 may determine that a beam is congested and may determine that UE 120 is to switch from using first ROs to using second ROs to reduce congestion associated with the beam. In this way, base station 110 may redirect PRACH attempts (e.g., 2-step RACH or 4-step RACH procedure transmissions) from a first, congested beam associated with a first SSE to a second, less congested beam associated with a second SSE. Additionally, or alternatively, base station 110 may determine to cause UE 120 to autonomously switch ROs periodically. For example, to avoid congestion on a particular beam, base station 110 may determine to configure UE 120 to periodically switch ROs according to a switching configuration.

As further shown in FIG. 5, and by reference number 520, base station 110 may provide RO switching information to UE 120. For example, base station 110 may indicate that a first RO associated with a first one or more SSB beams is unavailable to UE 120. Additionally, or alternatively, base station 110 may indicate a pre-configured switching pattern for UE 120 to use in performing one or more subsequent RO switches. For example, base station 110 may explicitly identify the pre-configured switching pattern, provide information from which UE 120 may select or configure a stored pre-configured switching pattern, and/or the like.

In some aspects, UE 120 may determine to switch from the first RO associated with the first one or more SSB beams to a second RO associated with a second one or more SSBs. For example, UE 120 may determine to switch ROs based at least in part on receiving the RO switching information, a timing event associated with a pre-configured switching pattern, and/or the like. In some aspects, UE 120 may select the second RO associated with the second one or more beams based at least in part on a measurement. For example, UE 120 may select the second RO based at least in part on a congestion measurement, a channel quality measurement, and/or the like.

Additionally, or alternatively, UE 120 may use a random selection procedure to select the second RO. In some aspects, base station 110 may indicate a selection of the second RO from a pre-configured set of available ROs. In some aspects, UE 120 may determine a quasi-co-location (QCL) parameter of an indication of an RO switch and may select the second RO based at least in part on the QCL parameter. For example, UE 120 may select a second RO associated with a beam that is quasi-co-located with a beam with which UE 120 received the indication of the RO switch.

In some aspects, base station 110 may indicate the second RO to UE 120. For example, base station 110 may transmit information identifying a set of one or more available ROs. In this case, UE 120 may determine to switch from the first RO to a second RO selected from the set of one or more available ROs. In some aspects, base station 110 may transmit an indication via a particular type of message. For example, base station 110 may transmit DCI, a MAC control element (MAC-CE), a paging message, and/or the like to trigger an RO switch, Additionally, or alternatively, base station 110 transmit an RAR message triggering the RO switch. For example, when base station 110 identifies a collision associated with a first PRACH communication on the first RO, base station 110 may transmit an RAR message as a response to the first PRACH communication to trigger a second PRACH communication on a second RO.

As further shown in FIG. 5, and by reference number 530, UE 120 may transmit a PRACH communication using a different RO. For example, UE 120 may switch from transmitting PRACH communications using a first RO to transmitting PRACH communications using a second RO. In some aspects, UE 120 may continue using the second RO for a particular duration. For example, UE 120 may use the second RO until another indication is received from base station 110 indicating another RO switch. Additionally, or alternatively, UE 120 may use the second RO until expiration of a threshold period of time. For example, an indication of the RO switch may include information indicating that the RO switch is valid for a particular period of time after which UE 120 may return to using, for example, the first RO.

As indicated above, FIG. 5 is provided as an example. Other examples may differ from what is described with respect to FIG. 5.

Figure 6:
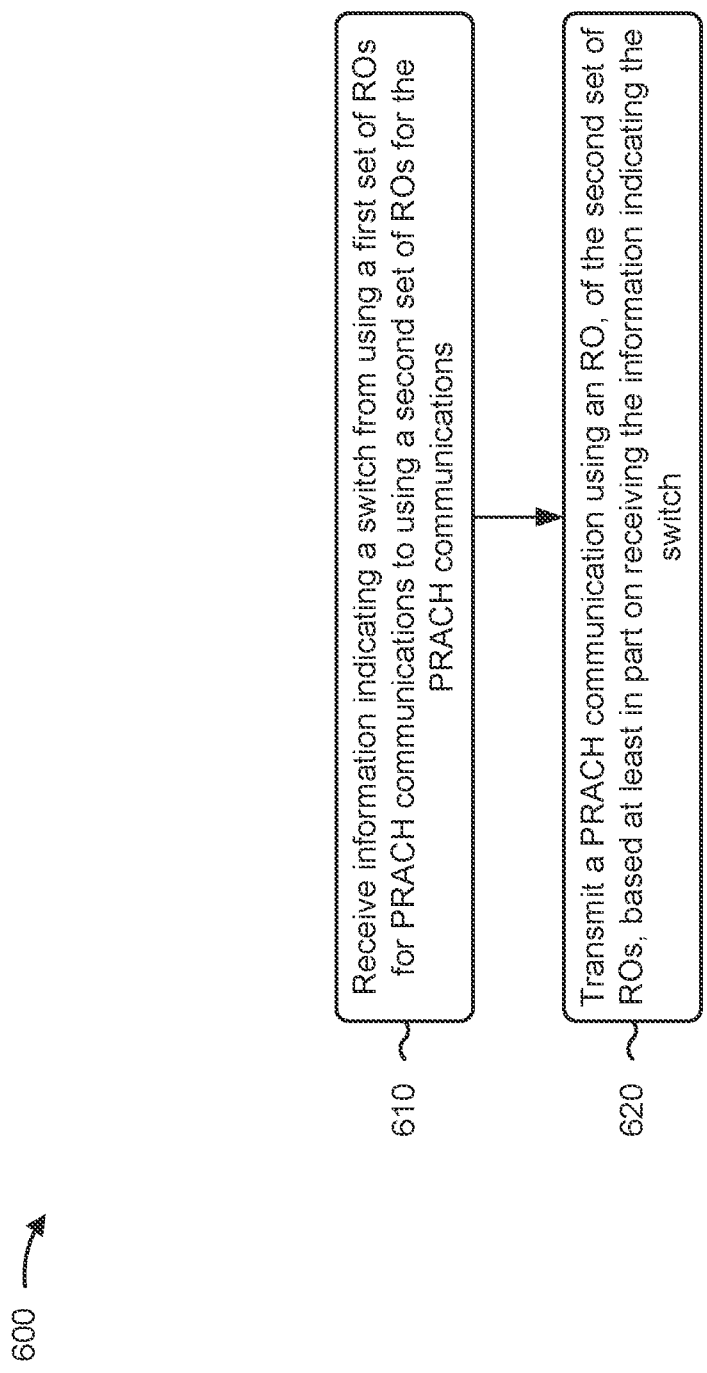
FIGS. 6-7 are diagrams illustrating example processes associated with random access channel beam management, in accordance with the present disclosure.

FIG. 6 is a diagram illustrating an example process 600 performed, for example, by a UE, in accordance with the present disclosure. Example process 600 is an example where the UE (e.g., UE 120 anchor the like) performs operations associated with RACH beam management.

As shown in FIG. 6, in some aspects, process 600 may include receiving information indicating a switch from using a first set of ROs for PRACH communications to using a second set of ROs for the PRACH communications (block 610). For example, the UE (e.g., using receive processor 258, transmit processor 264, controller/processor 280, memory 282, and/or the like) may receive information indicating a switch from using a first set of ROs for PRACH communications to using a second set of ROs for the PRACH communications, as described above.

As further shown in FIG. 6, in some aspects, process 600 may include transmitting a PRAM communication using an RO, of the second set of ROs, based at least in part on receiving the information indicating the switch (block 620). For example, the UE (e.g., using receive processor 258, transmit processor 264, controller/processor 280, memory 282, and/or the like) may transmit a PRACH communication using an RO, of the second set of ROs, based at least in part on receiving the information indicating the switch, as described above.

Process 600 may include additional aspects, such as any single aspect or any combination of aspects described below and/or in connection with one or more other processes described elsewhere herein.

In a first aspect, receiving the information indicating the switch comprises receiving information indicating that the first set of ROs, associated with a first set of SSB beams, is not available.

In a second aspect, alone or in combination with the first aspect, process 600 includes selecting the second set of ROs, associated with a second set of SSB beams, to use for transmitting the PRACH communication.

In a third aspect, alone or in combination with one or more of the first and second aspects, selecting the second set of ROs includes selecting the second set of ROs based at least in part on one or more measurements or on a random selection procedure.

In a fourth aspect, alone or in combination with one or more of the first through third aspects, receiving the information indicating the switch includes receiving information identifying the second set of ROs, and determining of switch from using the first set of ROs to using the second set of ROs.

In a fifth aspect, alone or in combination with one or more of the first through fourth aspects, transmitting the PRACH communication includes selecting an RO from the second set of ROs, and transmitting using the selected RO.

In a sixth aspect, alone or in combination with one or more of the first through fifth aspects, receiving the information indicating the switch includes receiving the information indicating the switch via a dynamic signaling message.

In a seventh aspect, alone or in combination with one or more of the first through sixth aspects, the dynamic signaling message includes at least one of a downlink control information, a MAC-CE, or a paging message.

In an eighth aspect, alone or in combination with one or more of the first through seventh aspects, process 600 includes receiving further information associated with indicating another switch associated with PRACH communications, and transmitting one or more PRACH communications in accordance with the further information.

In a ninth aspect, alone or in combination with one or more of the first through eighth aspects, process 600 includes determining that a threshold amount of time associated with the information indicating the switch has elapsed, and returning to using the first set of ROs for PRACH communications.

In a tenth aspect, alone or in combination with one or more of the first through ninth aspects, receiving the information indicating the switch includes receiving a random access response message triggered by a PRACH collision.

In an eleventh aspect, alone or in combination with one or more of the first through tenth aspects, receiving the information indicating the switch includes receiving information indicating a switching pattern for switching between the first set of ROs and the second set of ROs.

In a twelfth aspect, alone or in combination with one or more of the first through eleventh aspects, the information indicating the switch includes information identifying the second set of ROs.

In a thirteenth aspect, alone or in combination with one or more of the first through twelfth aspects, the second set of ROs is preconfigured and the information indicating the switch includes information activating the second set of ROs.

In a fourteenth aspect, alone or in combination with one or more of the first through thirteenth aspects, process 600 includes determining the second set of ROs based at least in part on a quasi-co-location parameter of a message including the information indicating the switch.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
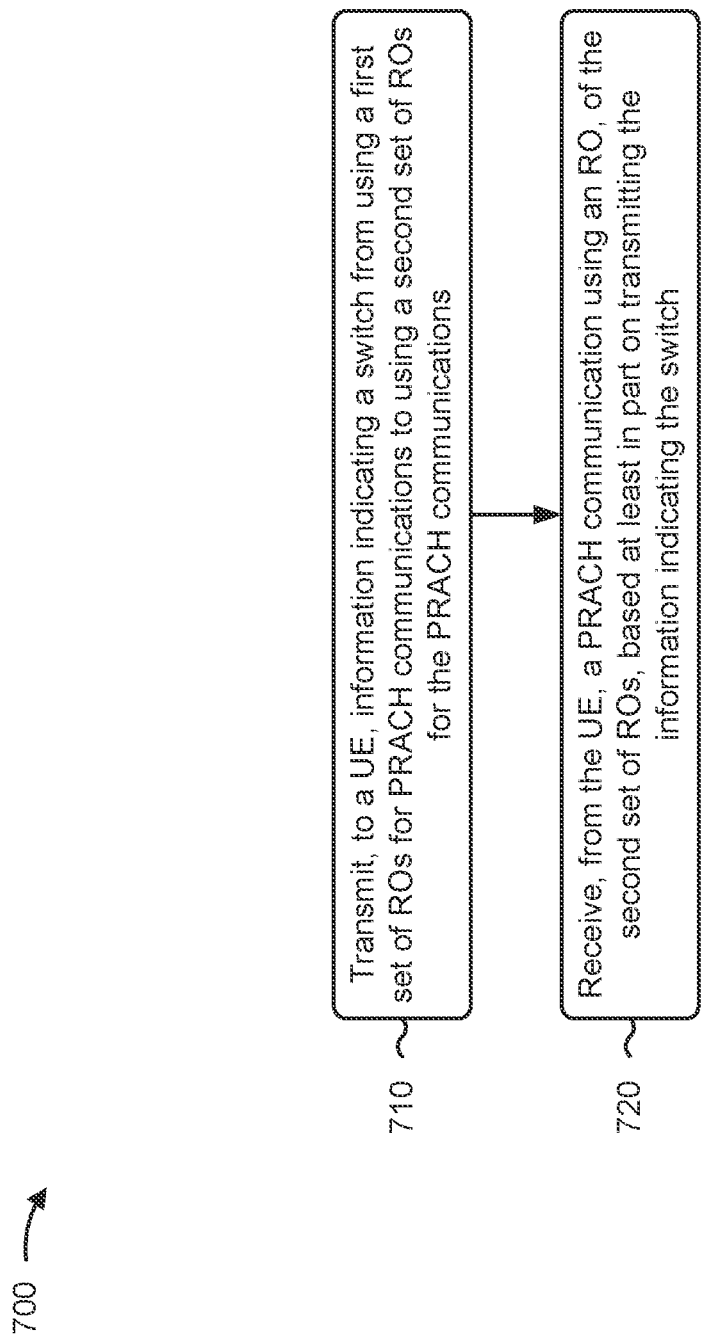

FIG. 7 is a diagram illustrating an example process 700 performed, for example, by a base station, in accordance with the present disclosure. Example process 700 is an example where the base station (e.g., base station 110 and/or the like) performs operations associated with RACH beam management.

As shown in FIG. 7, in some aspects, process 700 array include transmitting, to a UE, information indicating a switch from using a first set of ROs for PRACH communications to using a second set of ROs for the PRACH communications (block 710). For example, the base station (e.g., using transmit processor 220, receive processor 238, controller/processor 240, memory 242, and/or the like) may transmit, to a UE, information indicating a switch from using a first set of ROs for PRACH communications to using a second set of ROs for the PRACH communications, as described above.

As further shown in FIG. 7, in some aspects, process 700 may include receiving, from the UE, a PRACH communication using an RO, of the second set a ROs, based at least in part on transmitting the information indicating the switch (block 720). For example, the base station (e.g., using transmit processor 220, receive processor 238, controller/processor 240, memory 242, and/or the like) may receive, from the UE, a PRACH communication using an RO, of the second set of ROs, based at least in part on transmitting the information indicating the switch, as described above.

Process 700 may include additional aspects, such as any single aspect or any combination of aspects described below and/or in connection with one or more other processes described elsewhere herein.

In a first aspect, transmitting the information indicating the switch comprises transmitting information indicating that the first set of ROs, associated with a first set of SSB beams, is not available.

In a second aspect, alone or in combination with the first aspect, process 700 includes transmitting a second set of SSB beams to enable the UE to select the second set of ROs to use for transmitting the PRACH communication.

In a third aspect, alone or in combination with one or more of the first and second aspects, transmitting the information indicating the switch includes transmitting information identifying the second set of ROs to trigger a switch from using the first set of ROs to using the second set of ROs.

In a fourth aspect, alone or in combination with one or more of the first through third aspects, transmitting the information indicating the switch includes transmitting the information indicating the switch via a dynamic signaling message.

In a fifth aspect, alone or in combination with one or more of the first through fourth aspects, the dynamic signaling message includes at least one of a downlink control information, a MAC-CE, or a paging message.

In a sixth aspect, alone or in combination with one or more of the first through fifth aspects, process 700 includes transmitting further information associated with indicating another switch associated with PRACH communications; and receiving one or more PRACH communications in accordance with the further information.

In a seventh aspect, alone or in combination with one or more of the first through sixth aspects, process 700 includes returning to receiving PRACH communications from the UE using the first set of ROs after a threshold amount of time has elapsed.

In an eighth aspect, alone or in combination with one or more of the first through seventh aspects, transmitting the information indicating the switch includes detecting a PRACH collision, and transmitting a random access response message triggered by the PRACH collision.

In a ninth aspect, alone or in combination with one or more of the first through eighth aspects, transmitting the information indicating the switch includes transmitting information indicating a switching pattern for switching between the first set of ROs and the second set of ROs.

In a tenth aspect, alone or in combination with one or more of the first through ninth aspects, the information indicating the switch includes information identifying the second set of ROs.

In an eleventh aspect, alone or in combination with one or more of the first through tenth aspects, the second set of ROs is preconfigured and the information indicating the switch includes information activating the second set of ROs.

In a twelfth aspect, alone or in combination with one or more of the first through eleventh aspects, transmitting the information indicating the switch includes transmitting the information indicating the switch using a quasi-co-location parameter that indicates the second set of ROs.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
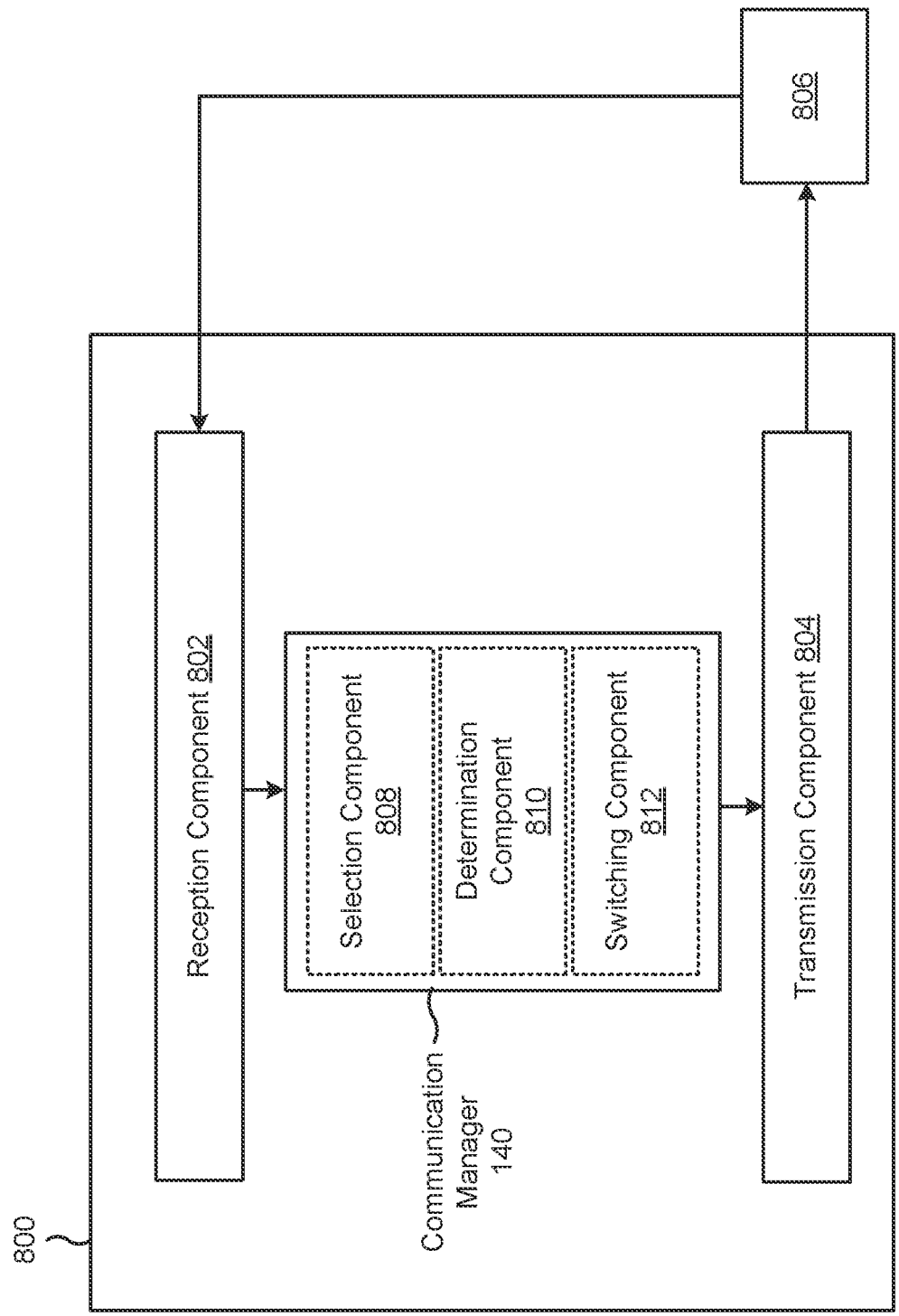
FIGS. 8-9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a selection component 808, a determination component 810, or a switching component 812, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a not-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, interleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive information indicating a switch from using a first set of ROs for PRACH communications to using a second set of ROs for the PRACH communications. The transmission component 804 may transmit a PRACH communication using an RO, of the second set of ROs, based at least in part on receiving the information indicating the switch.

The selection component 808 may select the second set of ROs, associated with a second set of SSB beams, to use for transmitting the PRACH communication. The reception component 802 may receive further information associated with indicating another switch associated with PRACH communications. The transmission component 804 may transmit one or more PRACH communications in accordance with the further information.

The determination component 810 may determine that a threshold amount of time associated with the information indicating the switch has elapsed. The switching component 812 may return to using the first set of ROs for PRACH communications. The determination component 810 may determine the second set of ROs based at least in part on a quasi-co-location parameter of a message including the information indicating the switch.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
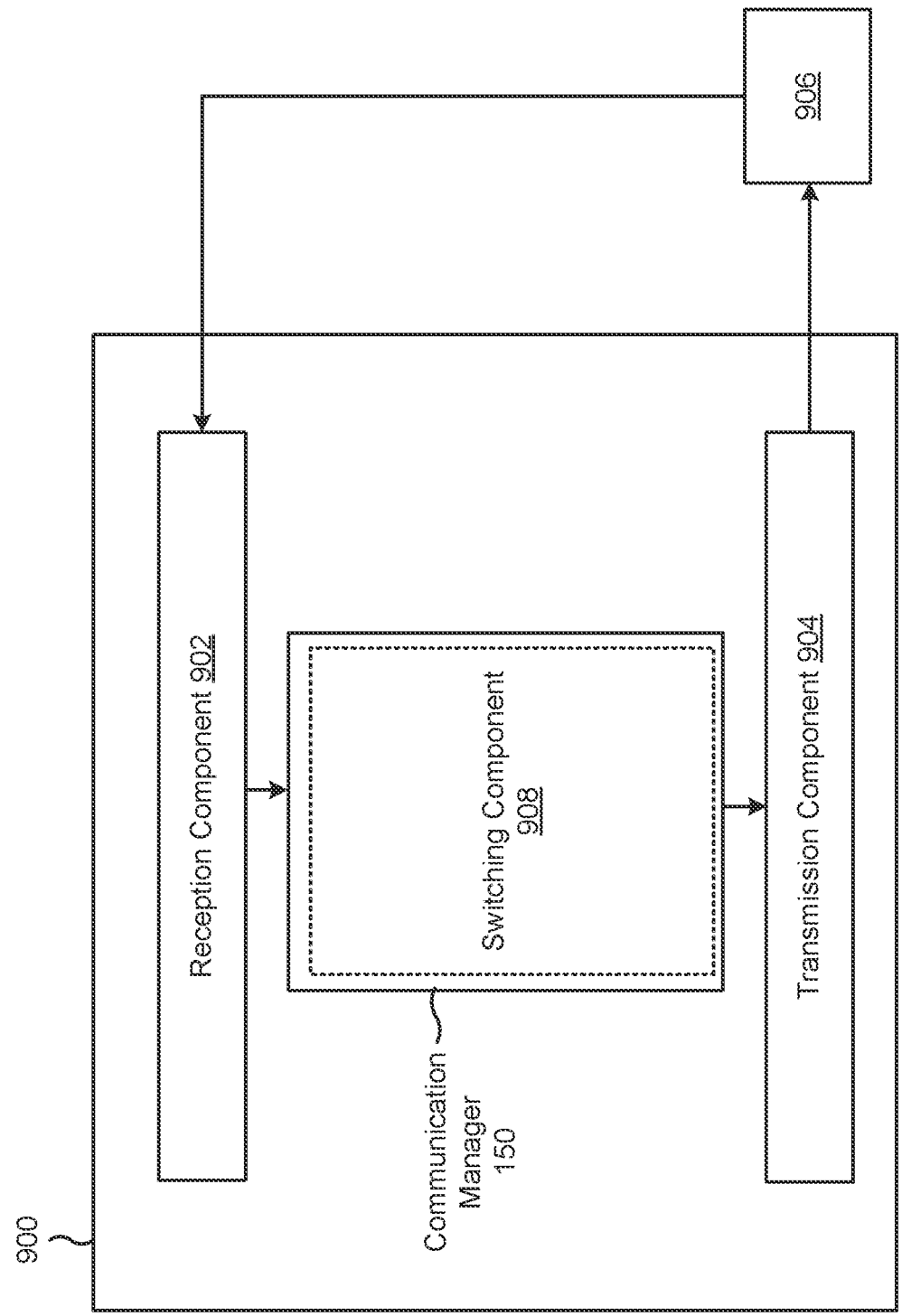

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a switching component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit, to a UE, information indicating a switch from using a first set of ROs for PRACH communications to using a second set of ROs for the PRACH communications. The reception component 902 may receive, from the UE, a PRACH communication using an RO, of the second set of ROs, based at least in part on transmitting the information indicating the switch.

The transmission component 904 may transmit a second set of SSB beams to enable the UE to select the second set of ROs to use for transmitting the PRACH communication. The transmission component 904 may transmit further information associated with indicating another switch associated with PRACH communications. The reception component 902 may receive one or more PRACH communications in accordance with the further information. The switching component 908 may return to receiving PRACH communications from the UE using the first set of ROs after a threshold amount of time has elapsed.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving information indicating a switch from using a first set of random access channel (RACH) occasions (ROs) for physical RACH (PRACH) communications to using a second set of ROs for the PRACH communications; and transmitting a PRACH communication using an RO, of the second set of ROs, based at least in part on receiving the information indicating the switch.

Aspect 2: The method of Aspect 1, wherein receiving the information indicating the switch comprises: receiving information indicating that the first set of ROs, associated with a first set of synchronization signal block (SSB) beams, is not available.

Aspect 3: The method of Aspect 2, further comprising: selecting the second set of ROs, associated with a second set of SSB beams, to use for transmitting the PRACH communication.

Aspect 4: The method of Aspect 3, wherein selecting the second set of ROs comprises: selecting the second set of ROs based at least in part on one or more measurements or on a random selection procedure.

Aspect 5: The method of any of Aspects 1 to 4, wherein receiving the information indicating the switch comprises: receiving information identifying the second set of ROs, and determining to switch from using the first set of ROs to using the second set of ROs.

Aspect 6: The method of Aspect 5, wherein transmitting the PRACH communication comprises: selecting an RO from the second set of ROs; and transmitting using the selected RO.

Aspect 7: The method of any of Aspects 1 to 6, wherein receiving the information indicating the switch comprises: receiving the information indicating the switch via a dynamic signaling message.

Aspect 8: The method of Aspect 7, wherein the dynamic signaling message includes at least one of a downlink control information, a medium access control control element, or a paging message.

Aspect 9: The method of any of Aspects 1 to 8, further comprising: receiving further information associated with indicating another switch associated with PRACH communications; and transmitting one or more PRACH communications in accordance with the further information.

Aspect 10: The method of any of Aspects 1 to 9, further comprising: determining that a threshold amount of time associated with the information indicating the switch has elapsed; and returning to using the first set of ROs for PRACH communications.

Aspect 11: The method of any of Aspects 1 to 10, wherein receiving the information indicating the switch comprises: receiving a random access response message triggered by a PRACH collision.

Aspect 12: The method of any of Aspects 1 to 11, wherein receiving the information indicating the switch comprises: receiving information indicating a switching pattern for switching between the first set of ROs and the second set of ROs.

Aspect 13: The method of any of Aspects 1 to 12, wherein the information indicating the switch includes information identifying the second set of ROs.

Aspect 14: The method of any of Aspects 1 to 13, wherein the second set of ROs is preconfigured and the information indicating the switch includes information activating the second set of ROs.

Aspect 15: The method of any of Aspects 1 to 14, further comprising: determining the second set of ROs based at least in part on a quasi-co-location parameter of a message including the information indicating the switch.

Aspect 16: A method of wireless communication performed by a base station (BS), comprising: transmitting, to a user equipment (UE), information indicating a switch from using a first set of random access channel (RACH) occasions (ROs) for physical RACH (PRACH) communications to using a second set of ROs for the PRACH communications; and receiving, from the UE, a PRACH communication using an RO, of the second set of ROs, based at least in part on transmitting the information indicating the switch.

Aspect 17: The method of Aspect 16, wherein transmitting the information indicating the switch comprises: transmitting information indicating that the first set of ROs, associated with a first set of synchronization signal block (SSB) beams, is not available.

Aspect 18: The method of Aspect 17, further comprising: transmitting a second set of SSB beams to enable the UE to select the second set of ROs to use for transmitting the PRACH communication.

Aspect 19: The method of any of Aspects 16 to 18, wherein transmitting the information indicating the switch comprises: transmitting information identifying the second set of ROs to trigger a switch from using the first set of ROs to using the second set of ROs.

Aspect 20: The method of any of Aspects 16 to 19, wherein transmitting the information indicating the switch comprises: transmitting the information indicating the switch via a dynamic signaling message.

Aspect 21: The method of Aspect 20, wherein the dynamic signaling message includes at least one of a downlink control information, a medium access control control element, or a paging message.

Aspect 22: The method of any of Aspects 16 to 21, further comprising: transmitting further information associated with indicating another switch associated with PRACH communications; and receiving one or more PRACH communications in accordance with the further information.

Aspect 23: The method of any of Aspects 16 to 22, further comprising: returning to receiving PRACH communications from the UE using the first set of ROs after a threshold amount of time has elapsed.

Aspect 24: The method of any of Aspects 16 to 23, wherein transmitting the information indicating the switch comprises: detecting a PRACH collision; and transmitting a random access response message triggered by the PRACH collision.

Aspect 25: The method of any of Aspects 16 to 24, wherein transmitting the information indicating the switch comprises: transmitting information indicating a switching pattern for switching between the first set of ROs and the second set of ROs.

Aspect 26: The method of any of Aspects 16 to 25, wherein the information indicating the switch includes information identifying the second set of ROs.

Aspect 27: The method of any of Aspects 16 to 26, wherein the second set of ROs is preconfigured and the information indicating the switch includes information activating the second set of ROs.

Aspect 28: The method of any of Aspects 16 to 27, wherein transmitting the information indicating the switch comprises: transmitting the information indicating the switch using a quasi-co-location parameter that indicates the second set of ROs.

Aspect 29: An apparatus for wireless communication at a device, comprising a processor; memory coupled with the processor; and instructions stored in the memory and executable by the processor to cause the apparatus to perform the method of one or mare of Aspects 1-15.

Aspect 30: A device for wireless communication, comprising a memory and one or more processors coupled to the memory, the one or more processors configured to perform the method of one or more of Aspects 1-15.

Aspect 31: An apparatus for wireless communication, comprising at least one means for performing the method of one or more of Aspects 1-15.

Aspect 32: A non-transitory computer-readable medium storing code for wireless communication, the code comprising instructions executable by a processor to perform the method of one or more of Aspects 1-15.

Aspect 33: A non-transitory computer-readable medium storing a set of instructions for wireless communication, the set of instructions comprising one or more instructions that, when executed by one or more processors of a device, cause the device to perform the method of one or more of Aspects 1-15.

Aspect 34: An apparatus for wireless communication at a device, comprising a processor, memory coupled with the processor; and instructions stored in the memory and executable by the processor to cause the apparatus to perform the method of one or more of Aspects 16-28.

Aspect 35: A device for wireless communication, comprising a memory and one or more processors coupled to the memory, the one or more processors configured to perform the method of one or more of Aspects 16-28.

Aspect 36: An apparatus for wireless communication, comprising at least one means for performing the method of one or more of Aspects 16-28.

Aspect 37: A non-transitory computer-readable medium storing code for wireless communication, the code comprising instructions executable by a processor to perform the method of one or more of Aspects 16-28.

Aspect 38: A non-transitory computer-readable medium storing a set of instructions for wireless communication, the set of instructions comprising one or more instructions that, when executed by one or more processors of a device, cause the device to perform the method of one or mote of Aspects 16-28.

The foregoing disclosure provides illustration and description, but is not intended to be exhaustive or to limit the aspects to the precise forms disclosed. Modifications and variations may be made in light of the above disclosure or may be acquired front practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and inlay be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive information indicating a switch from using a first set of random access channel (RACH) occasions (ROs), associated with a first set of synchronization signal block (SSB) beams, for physical RACH (PRACH) communications to using a second set of ROs, associated with a second set of SSB beams, for the PRACH communications, wherein the switch is based at least in part on a first beam of the first set of SSB beams being not available; and
      transmit, based at least in part on receiving the information indicating the switch, a PRACH communication using an RO, of the second set of ROs, on a SSB beam of the second set of SSB beams.

2. The UE of claim 1, wherein the one or more processors, to receive the information indicating the switch, are configured to:
   receive information indicating that the first set of ROs, associated with the first set of synchronization signal block (SSB) beams, is not available.

3. The UE of claim 2, wherein the one or more processors are further configured to:
   select the second set of ROs, associated with the second set of SSB beams, to use for transmitting the PRACH communication.

4. The UE of claim 3, wherein the one or more processors, to select the second set of ROs, are configured to:
   select the second set of ROs based at least in part on one or more measurements or on a random selection procedure.

5. The UE of claim 1, wherein the one or more processors, to receive the information indicating the switch, are configured to:
   receive information identifying the second set of ROs; and
   determine to switch from using the first set of ROs to using the second set of ROs.

6. The UE of claim 5, wherein the one or more processors, to transmit the PRACH communication, are configured to:
   select an RO from the second set of ROs; and
   transmit using the selected RO.

7. The UE of claim 1, wherein the one or more processors, to receive the information indicating the switch, are configured to:
   receive the information indicating the switch via a dynamic signaling message.

8. The UE of claim 7, wherein the dynamic signaling message includes at least one of a downlink control information, a medium access control control element, or a paging message.

9. The UE of claim 1, wherein the one or more processors are further configured to:
   receive further information associated with indicating another switch associated with PRACH communications; and
   transmit one or more PRACH communications in accordance with the further information.

10. The UE of claim 1, wherein the one or more processors are further configured to:
    determine that a threshold amount of time associated with the information indicating the switch has elapsed; and
    return to using the first set of ROs for PRACH communications.

11. The UE of claim 1, wherein the one or more processors, to receive the information indicating the switch, are configured to:
    receive a random access response message triggered by a PRACH collision.

12. The UE of claim 1, wherein the one or more processors, to receive the information indicating the switch, are configured to:
    receive information indicating a switching pattern for switching between the first set of ROs and the second set of ROs.

13. The UE of claim 1, wherein the information indicating the switch includes information identifying the second set of ROs.

14. The UE of claim 1, wherein the second set of ROs is preconfigured and the information indicating the switch includes information activating the second set of ROs.

15. The UE of claim 1, wherein the one or more processors are further configured to:
    determine the second set of ROs based at least in part on a quasi-co-location parameter of a message including the information indicating the switch.

16. A base station (BS) for wireless communication, comprising:
    a memory; and
    one or more processors, coupled to the memory, configured to:
       transmit, to a user equipment (UE), information indicating a switch from using a first set of random access channel (RACH) occasions (ROs), associated with a first set of synchronization signal block (SSB) beams, for physical RACH (PRACH) communications to using a second set of ROs, associated with a second set of SSB beams, for the PRACH communications, wherein the switch is based at least in part on a first beam of the first set of SSB beams being not available; and
       receive, from the UE, and based at least in part on receiving the information indicating the switch, a PRACH communication using an RO, of the second set of ROs, on a SSB beam of the second set of SSB beams.

17. The BS of claim 16, wherein the one or more processors, to transmit the information indicating the switch, are configured to:
    transmit information indicating that the first set of ROs, associated with the first set of synchronization signal block (SSB) beams, is not available.

18. The BS of claim 17, wherein the one or more processors are further configured to:
    transmit the second set of SSB beams to enable the UE to select the second set of ROs to use for transmitting the PRACH communication.

19. The BS of claim 16, wherein the one or more processors, to transmit the information indicating the switch, are configured to:

transmit information identifying the second set of ROs to trigger a switch from using the first set of ROs to using the second set of ROs.

20. The BS of claim 16, wherein the one or more processors, to transmit the information indicating the switch, are configured to:
transmit the information indicating the switch via a dynamic signaling message.

21. The BS of claim 20, wherein the dynamic signaling message includes at least one of a downlink control information, a medium access control control element, or a paging message.

22. The BS of claim 16, wherein the one or more processors are further configured to:
transmit further information associated with indicating another switch associated with PRACH communications; and
receive one or more PRACH communications in accordance with the further information.

23. The BS of claim 16, wherein the one or more processors are further configured to:
return to receiving PRACH communications from the UE using the first set of ROs after a threshold amount of time has elapsed.

24. The BS of claim 16, wherein the one or more processors, to transmit the information indicating the switch, are configured to:
detect a PRACH collision; and
transmit a random access response message triggered by the PRACH collision.

25. The BS of claim 16, wherein the one or more processors, to transmit the information indicating the switch, are configured to:
transmit information indicating a switching pattern for switching between the first set of ROs and the second set of ROs.

26. The BS of claim 16, wherein the information indicating the switch includes information identifying the second set of ROs.

27. The BS of claim 16, wherein the second set of ROs is preconfigured and the information indicating the switch includes information activating the second set of ROs.

28. A method of wireless communication performed by a user equipment (UE), comprising:
receiving information indicating a switch from using a first set of random access channel (RACH) occasions (ROs), associated with a first set of synchronization signal block (SSB) beams, for physical RACH (PRACH) communications to using a second set of ROs, associated with a second set of SSB beams, for the PRACH communications, wherein the switch is based at least in part on a first beam of the first set of SSB beams being not available; and
transmitting, based at least in part on receiving the information indicating the switch, a PRACH communication using an RO, of the second set of ROs, on a SSB beam of the second set of SSB beams.

29. The method of claim 28, wherein receiving the information indicating the switch comprises:
receiving information indicating that the first set of ROs, associated with the first set of synchronization signal block (SSB) beams, is not available.

30. A method of wireless communication performed by a base station (BS), comprising:
transmitting, to a user equipment (UE), information indicating a switch from using a first set of random access channel (RACH) occasions (ROs), associated with a first set of synchronization signal block (SSB) beams, for physical RACH (PRACH) communications to using a second set of ROs, associated with a second set of SSB beams, for the PRACH communications, wherein the switch is based at least in part on a first beam of the first set of SSB beams being not available; and
receiving, from the UE, and based at least in part on receiving the information indicating the switch, a PRACH communication using an RO, of the second set of ROs, on a SSB beam of the second set of SSB beams.

* * * * *